United States Patent
Sato

(10) Patent No.: US 7,449,506 B2
(45) Date of Patent: Nov. 11, 2008

(54) FLAME-RETARDANT POLYCARBONATE RESIN COMPOSITION

(75) Inventor: Ichiro Sato, Osaka (JP)

(73) Assignee: Sumitomo Dow Limited, Tokyo (JP)

( * ) Notice: Subject to any disclaimer, the term of this patent is extended or adjusted under 35 U.S.C. 154(b) by 325 days.

(21) Appl. No.: 10/522,928

(22) PCT Filed: Aug. 5, 2003

(86) PCT No.: PCT/JP03/09966

§ 371 (c)(1),
(2), (4) Date: Jan. 24, 2005

(87) PCT Pub. No.: WO2004/016690

PCT Pub. Date: Feb. 26, 2004

(65) Prior Publication Data

US 2005/0245670 A1    Nov. 3, 2005

(30) Foreign Application Priority Data

Aug. 6, 2002   (JP) .............................. 2002-229268

(51) Int. Cl.
*C08L 69/00* (2006.01)
*C08L 83/04* (2006.01)

(52) U.S. Cl. .......................... 524/95; 524/96; 524/122; 524/161; 524/267; 524/268; 524/269; 525/101; 525/464; 525/467

(58) Field of Classification Search .................. None
See application file for complete search history.

(56) References Cited

U.S. PATENT DOCUMENTS

| | | | |
|---|---|---|---|
| 3,956,235 A | 5/1976 | Pasternack et al. | |
| 4,837,280 A | 6/1989 | Awaji | |
| 5,236,633 A | 8/1993 | Satake et al. | |
| 5,354,514 A | 10/1994 | Satake et al. | |
| 5,514,740 A | 5/1996 | Miyake et al. | |
| 6,291,585 B1 | 9/2001 | Tomari et al. | |

FOREIGN PATENT DOCUMENTS

| | | | |
|---|---|---|---|
| EP | 0 216 412 | | 4/1987 |
| EP | 0 351 875 | | 1/1990 |
| EP | 1188792 | * | 3/2002 |
| JP | 5 163400 A | | 6/1993 |
| JP | 5-163405 A | | 6/1993 |
| JP | 05-163408 | | 6/1993 |
| JP | 5-163426 A | | 6/1993 |
| JP | 8-073653 A | | 3/1996 |
| JP | 2001-200151 | | 7/2001 |
| JP | 2001-226575 | | 8/2001 |

OTHER PUBLICATIONS

Machine translation of JP2001200151.*
CA Assession No. 127:222026, "Nontoxic marine antifouling coating with sustained effects", Taniguchi et al., Aug. 12, 1997.
CA Assession No. 131:318952, "Polymeric controlled-release microbiocides", Ghosh, (1999).

* cited by examiner

*Primary Examiner*—David Buttner
(74) *Attorney, Agent, or Firm*—Gary C Cohn PLLC

(57) ABSTRACT

A flame retardant polycarbonate resin composition comprises 100 parts by weight of a polycarbonate resin (A), 0.01 to 3 parts by weight of a silicone compound (B) having a branched chain structure and organic functional groups, wherein said organic functional groups comprise (I) aromatic groups or (ii) aromatic groups and hydrocarbon groups (excluding aromatic groups), 0.5 to 20 parts by weight of a phosphazene compound (C), 0.01 to 2 parts by weight of an organometallic salt (D) and 0.01 to 2 parts by weight of a fiber-forming type fluorine-containing polymer (E). 5 to 25 parts byweight of titanium oxide (F) and 0.05 to 2 parts by weight of a poly (organo hydrogen sioxane) (G), per 100 parts by weight of a polycarbonate resin (A), may be further added. Since the flame retardant polycarbonate resin composition of the present invention does not contain a halogen type flame retarding agent comprising chlorine compounds, bromine compounds and the like, no as derived from a halogen type flame retarding agent are generated when burned. Furthermore, the composition has a degree of flame retardance. a light reflectivity, and an excellent impact resistance, a heat resistance, a light resistance and can be used for various internal and external uses associated with electrical, electronic and OA applications.

16 Claims, No Drawings

FLAME-RETARDANT POLYCARBONATE RESIN COMPOSITION

FIELD OF THE INVENTION

The present invention relates to a flame retardant polycarbonate resin composition obtained upon formulating a specific silicone compound, a specific phosphazene compound, a specific organometallic salt, a fiber-forming, fluorine containing polymer used as a dripping inhibitor and also, when desired, a specific titanium oxide and a poly(organo hydrogen siloxane). The flame retardant polycarbonate resin composition of the present invention has an excellent flame retardance and also an excellent mechanical strength, molding properties and good appearance. Therefore, the composition can be used in a wide ranging variety of applications, particularly in the field of electronics, OA and the like.

BACKGROUND OF THE INVENTION

Polycarbonate resins are thermoplastic resins having an excellent impact resistance, heat resistance and the like that are widely used in areas such as electrical, electronic, OA, mechanical and automotive applications. In addition to the excellent performance exhibited by polycarbonate resins, a material having excellent flame retardance is being sought to satisfy the safety demands encountered in the electrical, electronic and OA fields. Therefore, many methods in which an organic bromine compound or an inorganic compound represented by phosphorus type compounds or metal oxides is added to improve the flame retardance of polycarbonate resins have been proposed and used.

However, the generation of a gas containing a halogen upon combustion is a concern when a halogen type compound such as an organic bromine compound is formulated, and desired in the market is a flame retarding agent that does not contain chlorine, bromine and the like. Numerous resin compositions obtained by adding a phosphorus type flame retarding agent typified by phosphate esters have been proposed as halogen free materials for flame retardant polycarbonate resins. To avoid the problems of adhesion to metal molds and metal mold pollution when molding the composition, for example, condensation type phosphate esters derived from resorcin are used in particularly numerous cases.

Problems to be Solved by the Invention

However, polycarbonate resin compositions to which condensation type phosphate esters have been added do not necessarily provide a satisfactory balance of light and heat resistance, impact strength and fluidity. In addition, condensation type phosphate ester flame retarding agents had another problem associated with the lack of a synergistic flame retarding effect when a silicone compound of the present invention was used in combination.

Means to Solve the Problems

The inventors conducted a diligent study to solve the problems mentioned above. As a result, the inventors made a surprising discovery that a synergistic flame retardant effect was realized when a composition was obtained by adding a specific silicone compound and a phosphazene compound having a specific structure to a polycarbonate resin.

In addition, not only was flame retardance provided, but also an excellent balance was achieved among properties such as mechanical strength, molding properties, appearance and the like when a specific organometallic salt and a fiber-forming type polymer containing fluorine were added as well as when a specific titanium oxide and a polyorgano hydrogen siloxane were also added in specific amounts as desired. The present invention was completed based on these discoveries.

That is, the present invention is a flame retardant polycarbonate resin composition comprising 100 parts by weight of a polycarbonate resin (A), 0.01 to 3 parts by weight of a silicone compound (B) having a branched chain structure and organic functional groups, wherein said organic functional groups comprise (i) aromatic groups or (ii) aromatic groups and hydrocarbon groups (excluding aromatic groups), 0.5 to 20 parts by weight of a phosphazene compound (C), 0.01 to 2 parts by weight of an organometallic salt (D) and 0.01 to 2 parts by weight of a fiber-forming type fluorine-containing polymer (E). A specific titanium oxide (F) and a poly(organo hydrogen siloxane) (G) may also be added to the composition in specific amounts when desired. Such a flame retardant polycarbonate resin composition exhibited extremely exceptional performance properties such as flame retardance, mechanical strength, molding properties, appearance and the like.

DISCLOSURE OF THE INVENTION

The present invention is illustrated in detail below.

The polycarbonate resin (A) used in the present invention is a polymer obtained using a phosgene method in which a variety of dihydroxydiaryl compounds is allowed to react with phosgene or in an ester exchange method in which a dihydroxydiaryl compound is allowed to react with a carbonate ester such as diphenyl carbonate. Polycarbonate resins manufactured using 2,2-bis(4-hydroxyphenyl)propane (bisphenol A) are cited as typical examples.

In addition to bisphenol A, bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl))octane, bis(4-hydroxyphenyl)phenylmethane, 2,2-bis(4-hydroxyphenyl-3-methylphenyl)propane, 1,1-(4-hydroxy-3-tertiary-butylphenyl)propane, 2,2-bis(4-hydroxy-3-bromophenyl)propane, 2,2-bis(4-hydroxy-3,5-dibromophenyl)propane and 2,2-bis(4-hydroxy-3,5-dichlorophenyl)propane; bis(hydroxyaryl)cycloalkanes such as 1,1-bis(4-hydroxyphenyl)cyclopentane and 1,1-bis(40hydroxyphenyl)cyclohexane; dihydroxydiaryl ethers such as 4,4'-dihydroxydiphenyl ether and 4,4'-dihydroxy-3,3'-dimethyl diphenyl ether; dihydroxydiaryl sulfides such as 4,4'-dihydroxydiphenyl sulfide; dihydroxydiaryl sulfoxides such as 4,4'-dihydroxydiphenyl sulfoxide and 4,4'-dihydroxy-3,3'-dimethyl diphenyl sulfoxide; and dihydroxydiaryl sulfones such as 4,4'-dihydroxydiphenyl sulfone and 4,4'-dihydroxy-3,3'-dimethyl diphenyl sulfone can be cited as the dihydroxydiaryl compound identified above,.

These compounds are used individually or as a mixture of at least two of them, but those containing no halogen substitution are preferred from the standpoint of preventing emission of a gas containing said halogen during combustion that is a concern. In addition, piperazine, dipiperazyl hydroquinone, resorcinol and 4,4'-dihydroxydiphenyl and the like may also be mixed and used.

Furthermore, the dihydroxyaryl compound identified above and a phenolic compound having at least three hydroxyl groups may be mixed and used. Fluoroglucine, 4,6-dimethyl-2,4,6-tri-(4-hydroxyphenyl)-heptene, 2,4,6-dimethyl-2,4,6-tri-(4-hydroxyphenyl)-heptane, 1,3,5-tri-(4-hydroxyphenyl)-benzol, 1,1,1-tri-(4-hydroxyphenyl-ethane and 2,2-bis-[4,4-(4,4'-dihydroxydiphenyl)-cyclohexyl]-propane can be cited as the phenol having at least three hydroxyl groups.

The viscosity average molecular weight of the polycarbonate resin (A) is ordinarily 10,000 to 100,000 and is preferably 15,000 to 35,000. When manufacturing such a polycarbonate resin, a molecular weight adjusting agent, a catalyst and the like can be used as necessary.

A silicone compound containing a branched main chain and containing organic functional groups represented by the general formula (Chemical formula 4) shown below

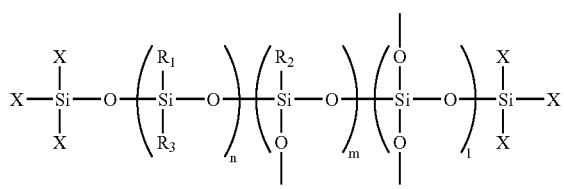

(in the formula $R_1$, $R_2$ and $R_3$ represent the organic functional groups on the main chain and X represents terminal functional groups while n, m and 1 represent the number of moles of individual units) wherein said organic functional groups comprise aromatic groups or aromatic groups and hydrocarbon groups (other than aromatic groups) may be used as the silicone compound (B) in the present invention.

That is, it is preferred that the silicone compound (B) contains at least 20 mole % of T units ($RSiO_{1.5}$) and/or Q units ($SiO_{2.0}$) based on the total siloxane units ($R_{3-0}SiO_{2-0.5}$), wherein R represents an organic functional group.

In addition, it is preferred that at least 20 mole % of the organic functional groups contained in the silicone compound (B) are aromatic groups. Phenyl, biphenyl, naphthalene or their derivatives are preferred as the aromatic groups present, and phenyl groups are more preferred. The side chains that are not phenyl groups are preferably hydrocarbon groups containing no more than four carbon atoms, more preferably methyl groups. The terminal groups are preferably at least one selected from the group consisting of methyl group, phenyl group and hydroxyl group.

The average molecular weight (weight average) of the silicone compound (B) is preferably 3,000 to 500,000, and the range of 5,000 to 270,000 is more preferred.

The amount of the silicone compound (B) added is 0.01 to 3 parts by weight per 100 parts by weight of the polycarbonate resin (A). Exceeding said range for the amount added is not desirable since the flame retarding effect is inadequate either way. More preferred is the range of 0.5 to 1.5 parts by weight.

As the phosphazene compound in the component (C) of the present invention, those compounds containing phosphorus and nitrogen in the molecule and previously well known can be used.

The phosphazene compound, for example, are:

(1) a cyclic phenoxyphosphazene represented by the general formula (Chemical formula 1)

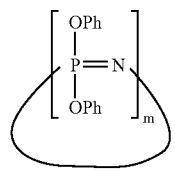

(wherein m represents an integer of 3 to 25, and Ph represents a phenyl group), (2) an open-chain phenoxyphosphazene represented by the general formula (Chemical formula 2)

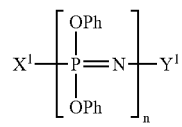

(wherein $X^1$ represents $-N=P(OPh)_3$ or $-N=P(O)OPh$, $Y^1$ represents $-P(OPh)_4$ or $-P(O)(OPh)_2$, n represents an integer of 3 to 10,000 and Ph represents a phenyl group), and (3) a crosslinked phenoxyphosphazene compound obtained by crosslinking at least one compound selected from the group consisting of said cyclic phenoxyphosphazenes and said open-chain phenoxyphosphazenes with at least one crosslinking group selected from the group consisting of o-phenylene group, m-phenylene group, p-phenylene group and bis-phenylene group represented by the general formula (Chemical formula 3)

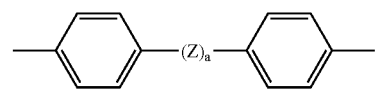

(wherein Z represents $-C(CH_3)_2-$, $-SO_2-$, $-S-$ or $-O-$ and a represents 0 or 1), wherein (a) said crosslinking group exists between the two oxygen atoms where phenyl groups of the phosphazene compounds have been removed, (b) the proportion of phenyl groups is 50% to 99.9% based on the total number of total phenyl groups in said phosphazene compound (Chemical formula 1) and/or said phosphazene compound (Chemical formula 2) identified above, and (c) no free hydroxyl group is present in the molecule.

The cyclic phenoxyphosphazene compound represented by the general formula (Chemical formula 1) shown above and the open-chain phenoxyphosphazene compound represented by the general formula (Chemical formula 2) shown above can be synthesized, for example, using a method described in H. R. Allcock, author, "Phosphorus-Nitrogen Compounds," Academic Press (1972) or in J. E. Mark, H. R. Allcock, R. West, authors, "Inorganic Polymers", Prentice-Hall International, Inc. (1992).

An example of the syntheses is described as follows. Ammonium chloride is allowed to react with phosphorus pentachloride or is allowed to react with phosphorus trichloride and chlorine at about 120° C. to 130° C. in chlorobenzene or tetrachloroethane as the solvent. As a result, a mixture of cyclic and open-chain dichlorophosphazene oligomers is obtained that is defined by the general formulae (Chemical formula 1) and (Chemical formula 2) wherein m and n are integer of 3 to 25 with the exception that the OPh groups in the formulae are instead chlorine atoms. The phosphazene compounds identified above can be manufactured by substituting this dichlorophosphazene oligomer mixture with phenol.

In addition, cyclic phenoxyphosphazene compounds such as hexaphenoxy cyclotriphosphazene, octaphenoxy cyclotetraphosphazene, decaphenoxy cyclopentaphosphazene and the like may be cited. Such compounds may be obtained through phenoxy substitution on a single cyclic dichlorophosphazene compound such as hexachlorocyclotriphosphazene, octachlorocyclotetraphosphazene, decachlorocyclopentaphosphazene and the like and recovered using distillation or recrystallization from the cyclic and open-chain dichlorophosphazene oligomer mixture obtained in the manner described above.

In addition, a open-chain phenoxyphosphazene compound obtained through a phenoxy substitution of a open-chain dichlorophosphazene represented by the general formula (Chemical formula 2) wherein n represents an integer of 3 to 10,000 and obtained using a ring opening polymerization of hexachlorocyclo triphosphazene by heating it to 220° C. to 250° C. can be cited.

A dichlorophosphazene may be used in the form of a mixture of a cyclic dichlorophosphazene and a open-chain dichlorophosphazene or individually upon separation.

A crosslinked phenoxyphosphazene compound can be manufactured by substituting a portion of the phenyl groups in the cyclic and/or open-chain phosphazene compound represented by the aforementioned general formulae (Chemical formula 1) and/or (Chemical formula 2) with an aromatic dihydroxy compound containing one or at least two benzene rings and containing two hydroxyl groups, that is, by crosslinking using a o-phenylene group, m-phenylene group, p-phenylene group and a (crosslinking) group represented by the aforementioned general formula (Chemical formula 3).

More specifically, a phenoxyphosphazene compound having high molecular weight due to a crosslinked construction and basically not containing terminal hydroxyl groups on one terminus of the dihydroxy compound can be obtained by first allowing the aforementioned dichlorophosphazene compound to react with a mixture of an alkali metal salt of a phenol and an alkali metal salt of a dihydroxy compound, synthesizing a partially substituted material containing a portion of the chlorine in the chlorophosphazene compound as residual chlorine and subsequently allowing the product to react with an alkali metal salt of a phenol. The reaction of the dichlorophosphazene compound with an alkali metal salt of a phenol and/or an aromatic dihydroxy compound is ordinarily conducted at a temperature of room temperature to about 150° C. in a solvent composed of aromatic hydrocarbons such as toluene and the like and halogenated aromatic hydrocarbons such as chlorobenzene and the like.

The production method for a crosslinked phosphazene compound is explained in further detail. In the first stage of the reaction, the amounts of an alkali metal salt of a phenol and an aromatic dihydroxy compound used per dichlorophosphazene oligomer should ordinarily be about 0.05 to 0.9 equivalent (relative to the amount of chlorine in the dichlorophosphazene oligomer) or preferably about 0.1 to 0.8 equivalent (relative to the amount of chlorine) considering the total amounts of both alkali metal salts.

In the first stage of the reaction, the amount of the aromatic dihydroxy compound that can be used is small and the effect of the crosslinked compound is small when the amounts of an alkali metal salt of a phenol and an aromatic dihydroxy compound used per dichlorophosphazene oligomer is much lower than 0.05 equivalent. However, a crosslinked phenoxyphosphazene compound containing essentially no terminal hydroxy groups on one end of the dihydroxy compound is difficult to obtain when the amount used grossly exceeds 0.9 equivalent.

The ratio (mole ratio of the alkali metal salt of an aromatic dihydroxy compound to the alkali metal salt of a phenol) of the two alkali metal salts is not particularly restricted and can be appropriately selected from a broad range, but it ordinarily should be about $1/2000$ to $1/4$. A desired crosslinked phenoxyphosphazene compound can be obtained within this range. When the usage ratio is much lower than $1/2000$, the effect of the crosslinking compound can potentially decline, making the prevention of dripping of the polycarbonate resin more difficult. Conversely, when the usage ratio grossly exceeds $1/4$, the crosslinking sometimes proceeds too extensively, and the crosslinked phenoxyphosphazene compound obtained sometimes becomes insoluble and infusible and its uniform dispersability in the resin sometimes can decline.

Next, in the second stage of the reaction, the amount of the phenol alkali metal salt used should ordinarily be about 1 to 1.5 equivalent (based upon the amount of chlorine in the dichlorophosphazene oligomer) and preferably about 1 to 1.2 equivalent (based upon the amount of chlorine).

Resorcinol, hydroquinone, catechol, 4,4-isopropylidene diphenol (bisphenol A), 4,4'-sulfonyl diphenol (bisphenol S), 4,4'-thiodiphenol, 4,4'-oxydiphenol and 4,4'-diphenols can be mentioned as the aromatic dihydroxy compound used to manufacture a crosslinked phosphazene compound. In addition, sodium salts, potassium salts, lithium salts and the like are preferred as alkali metal salts of the aromatic dihydroxy compound and/or phenol. One of the aromatic dihydroxy compounds may be used individually or at least two of them may be used in combination.

The phenyl group concentration in the crosslinked phenoxyphosphazene compound is 50% to 99.9% based on the number of total phenyl groups in the phosphazene compound (Chemical formula 1) and/or (Chemical formula 2) identified above, and 70% to 90% is preferred.

The phosphazene compound used as component (C) in the present invention, that is, a cyclic phosphazene compound represented by the general formula (Chemical formula 1), a open-chain phosphazene compound represented by the general formula (Chemical formula 2) and a crosslinked phenoxyphosphazene compound obtained by replacing a portion of the phenyl groups in the cyclic and open-chain phosphazene compounds represented by the aforementioned general formula (Chemical formula 1) and/or the general formula (Chemical formula 2) with o-phenyl groups, m-phenyl groups, p-phenyl groups and crosslinking groups and represented by the aforementioned general formula (Chemical formula 3) is manufactured.

The open-chain and cyclic crosslinked phenoxyphosphazene compounds of the present invention do not contain halogen and do not generate hydrogen halide and the like gases and smoke when decomposed or burned. In addition, they do not cause a metal mold to corrode and a resin to deteriorate and discolor during a resin molding stage. In addition, the phenoxyphosphazene compound identified above does not depress the molding temperature of a resin, has low volatility and does not cause problems such as blocking while kneading, bleeding (juicing), dripping during combustion and the like.

In addition, a crosslinked phenoxyphosphazene compound of the present invention is a crosslinked phenoxyphosphazene compound that basically does not contain a terminal hydroxy group on one end of a dihydroxy compound. Therefore, it does not depress molecular weight, mechanical properties such as impact resistance nor other properties such as heat resistance and molding properties inherent in the resin.

The amount of the phosphazene compound (C) added per 100 parts by weight of an aromatic polycarbonate resin is 0.5 to 20 parts by weight. When the amount of a phosphazene compound added is less than 0.5 part by weight, the flame retardance is inadequate. When the amount exceeds 20 parts by weight, the mechanical properties tend to be depressed readily. The amount of the phosphazene compound added per 100 parts by weight of the aromatic polycarbonate resin is preferably 1 to 20 parts by weight, but 4 to 10 parts by weight is more preferred.

The organometallic salt (D) includes a metal salt of an aromatic sulfonic acid and a metal salt of a perfluoroalkane sulfonic acid, preferably a potassium salt of 4-methyl-N-(4-methylphenyl)sulfonylbenzene sulfonamide, a potassium diphenylsulfone-3-sulfonate, a potassium diphenylsulfone-3, 3'-disulfonate, sodium para-toluene sulfonate, a potassium perfluorobutane sulfonate and the like.

The amount of the organometallic salt (D) added per 100 parts by weight of a polycarbonate resin (A) is 0.01 to 2 parts by weight. The option of adding less than 0.01 part by weight is undesirable since the flame retardance declines. In addition, when the amount added exceeds 2 parts by weight the mechanical performance and flame retardance are sometimes not obtained, and the problem of poorer surface appearance is encountered. A more preferable amount added is in the range of 0.2 to 1 part by weight.

As the fiber-forming fluorine-containing polymer (E) used in the present invention, those forming a fibril construction in the polycarbonate resin (A) are preferred. For example, polytetrafluoroethylene, tetrafluoroethylene type copolymers (for example, tetrafluoroethylene/hexafluoropropylene copolymers and the like), the partially fluorinated polymers shown in U.S. Pat. No. 4,379,910, polycarbonates manufactured from fluorinated diphenol and the like can be mentioned. Polytetrafluoroethylenes having a molecular weight of at least 1,000,000, a secondary particle size of at least 100 μm and an ability to form fibrils are preferably used.

The amount of the fiber-forming fluorine-containing polymer (E) is 0.01 to 2 parts by weight per 100 parts by weight. Drip prevention declines when the amount added is less than 0.01 part by weight. The option of using more than 2 parts by weight is not desirable since the surface appearance and mechanical performance (particularly impact resistance) decline. The range of 0.2 to 1 part by weight is more preferred.

Titanium oxide manufactured using either a chlorine method or a sulfuric acid method may be used as the titanium oxide (F) used in the present invention. As far as the crystal forms are concerned, either rutile type or anatase type may be used. In addition, the particle size of titanium oxide is preferably about 0.1 to 0.5 μm. A titanium oxide the surface of which is treated by a phosphoric acidized polyene is preferred.

It is preferred that the extent of the surface treatment of said titanium oxide (F) is such an extent that the weight of contained phosphorus is about 0.04% to 0.1% by weight based on the weight of the titanium oxide.

As the polyene, high molecular weight aliphatic acids containing multiple unsaturated bonds within a molecular structure and a minimum of ten carbon atoms, preferably about eighteen carbon atoms, and a maximum of twenty-eight carbon atoms are used. As more specific examples of the polyene, linolenic acid and linolic acid can be mentioned. In addition, mixtures of an aliphatic acid such as oleic acid that contains only one unsaturated bond in a molecule and a saturated aliphatic acid such as stearic acid and the like may also be used, and, furthermore, phosphoric acidized material of various aliphatic acid derivatives may also be present. Alkyl aliphatic acid esters, aliphatic acid amides and the like may be mentioned as more specific examples of such derivatives.

Many methods can be described for the phosphoric acidization of a polyene. The most commonly used means is a method using a Friedel-Kraft catalyst, and the detailed procedures are disclosed in the well known literature listed below.

E. Jungermann and J. J. McBridge, *J. Org. Chem.* 26, 4182 (1961).

E. Jungermann and J. J. McBridge, R. Clutter and A. Masis, *J. Org. Chem.* 27, 606 (1962).

Diphosphoric acid or diphosphoric acid esters of para-menthane can be identified as other effective polyenes. General formula (Chemical formula 5)

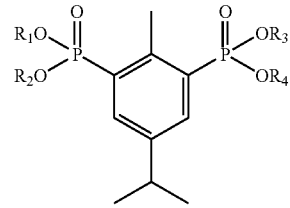

and general formula (Chemical formula 6)

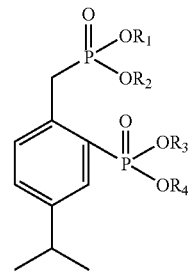

(in the formulae (Chemical formula 5) and (Chemical formula 6), $R_1$, $R_2$, $R_3$ and $R_4$ individually represent hydrogen atoms or C1 to C10 alkyl groups.) can be cited as the structures.

The amount of titanium oxide (F) added is 5 to 25 parts by weight per 100 parts by weight of a polycarbonate resin (A). When the amount added is less than 5 parts by weight, the light blocking performance is poor. When the amount exceeds 25 parts by weight, the impact is undesirable since the appearance and mechanical strength (particularly the impact strength) decline. The more preferred range is 9 to 15 parts by weight.

Methyl hydrodiene polysiloxane, methyl hydrodiene polycyclohexane and the like can be cited as the poly(organo hydrogen siloxane) (G). Those compounds selected from the structural units in the general formulae shown below (Chemical formula 7) to (Chemical formula 9) are particularly preferred. General formula (Chemical formula 7):

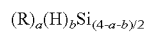

(wherein R is a monovalent hydrocarbon group containing no aliphatic unsaturation, a is 1.00 to 2.10, b is 0.1 to 1.0 and (a+b) is 2.00 to 2.67.) General formula (Chemical formula 8):

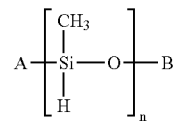

(wherein A and B are individually selected from

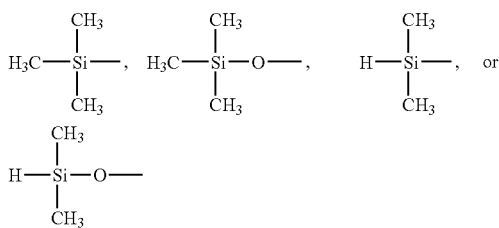

and n is an integer of 1 to 500.)

General formula (Chemical formula 9):

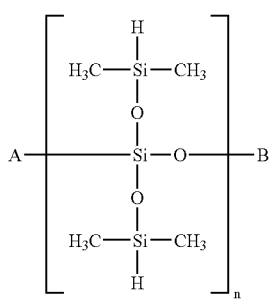

(wherein A, B and n are defined as those shown in the general formula (Chemical formula 8)).

When other poly(organo hydrogen siloxanes) are used, the molecular weight of the polycarbonate resins sometimes declines, the degree of yellowing sometimes rises when melting and kneading at high temperatures, a large amount of gas is sometimes generated and silver streaks and the like are sometimes created while molding.

The amount of the poly(organo hydrogen siloxane) (B) added is 0.05 to 2 parts by weight. When the amount added is less than 0.05 part by weight, silver streaks are generated in molded products, flame retardance declines and impact strength declines. When the amount exceeds 2 parts by weight, silver streaks are generated in molded products and flame retardance worsens, making this an undesirable option.

The aforementioned titanium oxide (F) and poly(organo hydrogen siloxane) (G) can be added directly to a polycarbonate resin (A) as is. In addition, the surface of the titanium oxide (F) may also be treated using a poly(organo hydrogen siloxane) (G) before adding it to a polycarbonate resin (A).

As the aforementioned surface treatment method, either a wet or a dry method may be used. In the wet method, titanium oxide (F) is added to a mixed solution of a poly(organo hydrogen siloxane) (G) in a low boiling solvent, the solution is agitated and the solvent is subsequently removed. Furthermore, the product may be subsequently subjected to a heat treatment at a temperature of 120° C. to 200° C. In the dry method, a poly(organo hydrogen siloxane) (G) and titanium oxide (F) are mixed and agitated using a mixing device such as a super mixer, Henschel mixer, V type tumbler and the like. In this case, the product may also be subjected to a heat treatment at a temperature of 120° C. to 200° C.

Various additives such as a thermal stabilizing agent, an oxidation inhibitor, a fluorescent whitening agent, a filler, a mold releasing agent, a softening material, an electrostatic inhibitor and the like as well as other polymers may also be added to an a aromatic polycarbonate resin composition in a range that does not interfere with the effect of the present invention.

Glass fibers, glass beads, glass flakes, carbon fibers, talc powder, clay powder, mica, aluminum borate whiskers, potassium titanate whiskers, Wollastonite powder, silica powder, alumina powder and the like, for example, may be cited as the filler.

Polyesters such as poly(ethylene terephthalate) and poly(butylene terephthalate); styrene type polymers such as polystyrene, high impact polystyrene and acrylonitrile-ethylene-propylene-diene type rubber (EPDM) .styrene copolymers; polypropylene and polymers ordinarily used by forming an alloy with polycarbonate, for example, may be mentioned as other polymers.

DESCRIPTION OF THE EXAMPLES

The present invention is explained more specifically using the examples below, but the present invention is not limited to these examples. The term "part" refers to "part by weight" unless otherwise noted.

The materials used in the experiments are described below.

1. Polycarbonate resin (henceforth abbreviated to "PC").

Sumitomo Dow Caliber-200-20, molecular weight: 18,600.

2. Silicone compound (henceforth abbreviated to "SI").

The silicone compounds were manufactured according to a commonly practiced production method.

That is, a suitable amount of diorgano dichlorosilane, monoorgano trichlorosilane and tetrachlorosilane or their partially hydrolyzed condensed material was dissolved in an organic solvent. Water was added to allow hydrolysis to occur, and a partially condensed silicone compound was formed. Furthermore, triorgano chlorosilane was added and allowed to react to complete the polymerization. The solvent was subsequently distilled to separate it.

The structural characteristics of the silicone compound synthesized using the method described above are presented below.

The ratio of D/T/Q units in the main chain: 40/60/0 (mole ratio)

The phenyl group ratio in total organic functional groups*: 60 mole %

Terminal groups: Methyl group only.

Weight average molecular weight**: 15,000

The phenyl group was present, first of all, in the T units in a silicone containing T units, and the remainder was present in D units. When a phenyl group was attached to a D unit, the presence of one was preferred but two were added when phenyl groups were still available. With the exception of the terminal groups, the organic functional groups other than phenyl groups were all methyl groups.

The weight average molecular weight was reported using two significant digits.

3. Phosphazane: The commercially available phosphazene listed below was used.

Ohtsuka Kagaku. Phosphazane SPE-100 (melting point: 110° C., phosphorus content: 13%, henceforth abbreviated to "PZ").

4. Phosphate ester ①: Asahi Denka Kogyo. Adekastub FP500 (resorcinol dixylenyl phosphate: henceforth abbreviated to "P1").

Phosphate ester ②: Asahi Denka Kogyo. Adekastub FP700 (bisphenol A diphenyl phosphate: henceforth abbreviated to "P2").

Phosphate ester ③: Asahi Denka Kogyo. Adekastub PFR (resorcinol diphenyl phosphate: henceforth abbreviated to "P3").

5. Organometallic salt:
   Sodium para-toluene sulfonate (henceforth abbreviated to "PTSNa").
6. Polytetrafluoroethylene:
   Daikin Kogyo Co. Neofron FA500 (henceforth abbreviated to "PTFE").
7. Titanium oxide:
   A titanium oxide the surface of which had been treated using a phosphoric acidized polyene material (linolenic acid was used as the polyene and the acid was modified using phosphoric acid). (The phosphorus concentration in the titanium oxide was 0.06%.) Alumina was used as the inorganic surface treatment agent of said titanium oxide. (Henceforth abbreviated to "$TiO_2$".)
8. Poly(organo hydrogen siloxane):
   Shin-Etsu Kagaku Kogyo Co. KF99 (viscosity: 20 cSt, 25° C.). (Henceforth abbreviated to "MHSO".)

In a formulation method the various starting materials described above were added in a single addition to a tumbler in the formulation ratios shown in Tables 1 to 3 and were dry blended. A biaxial extruder (Kobe Seiko Co., KTX37) was used to melt and knead the mixture at a fusion temperature of 280° C. to obtain pellets of a flame retardant polycarbonate resin composition.

Test pieces for the evaluation of ASTM specified mechanical properties and test pieces (0.8 mm thick) for the evaluation of flame retardance according to UL94 were prepared from the pellets obtained at a melt temperature of 300° C. using a J100E-C5 injection molding device manufactured by Nippon Seiko Co.

The evaluation methods are described below.

1. Impact Strength:
   A notched Izod impact strength was measured according to the provisions of ASTM D256 at 23° C. using ⅛ inch thick pieces. A numerical value of at least 35 kg·cm/cm was needed to be rated as "pass".

2. Flame Retardance:
   The flame retardance was evaluated according to the provisions of the UL94·V vertical combustion testing method described below.
   A test piece was left standing for 48 hours in a constant temperature chamber maintained at 23° C. and 50% humidity, and the flame retardance was evaluated according to the provisions of the UL94 test (a combustion test for a plastic material used in instrument parts) instituted by Underwriters Laboratories. UL94V refers to a test conducted by contacting a vertically oriented test piece of a designated size with a burner flame for ten seconds. The duration of time during which residual flame remained, the amount of dripping and the flame retardance were evaluated. The ratings are as follows:

|  | V-0 | V-1 | V-2 |
|---|---|---|---|
| Afterflame of each specimen | ≦10 sec. | ≦30 sec. | ≦30 sec. |
| Total afterflame of five specimen | ≦50 sec. | ≦250 sec. | ≦250 sec. |
| Ignition of cotton by dropping | no | no | yes |

The term "afterflame" as used herein means the period of time in which a test specimen continues burning after the source of ignition has been moved away. "The ignition of cotton by dripping" means whether or not a piece of cotton placed about 300 mm below the lower end of a specimen catches fire from a drip of melt from the specimen. The evaluation graded a 1.0 mm thick test piece a "pass" when it qualified for a ranking of V-0.

3. Deflection Temperature Under Load:
   A test piece 6.4 mm thick was evaluated using an HDT tester manufactured by Toyo Seiki at a fiber stress of 18.6 kg/cm$^2$. A temperature of at least 105° C. received a "pass" grading.

4. Light Reflectivity:
   A three-stage test piece plate (thicknesses 3 mm, 2 mm and 1 mm) 90 mm long and 40 mm wide was prepared, and a spectrophotometer (Model CMS-35SP manufactured by Murakami Shikisai Gijutsu Kenkyusho) was used to measure the Y value for the 1 mm thick section at a wavelength of 400 nm to 800 nm. Next, a Sunshine Weathermeter (black panel temperature: 83° C./no rain) manufactured by Suga Shikenki was used, and said test piece was exposed to light irradiation for 250 hours. The Y value was measured in the same manner as the Y value was measured for unexposed test pieces. A Y value of at least 94 was considered passing.

5. Degree of Yellowing (Henceforth Abbreviated to "ΔYI").
   A spectrophotometer (Model CMS-35SP manufactured by Murakami Shikisai Gijutsu Kenkyusho) was used according to the provisions of ASTM D1925, and test pieces having length×width×thickness=60×60×3.2 mm were used for the measurements. ΔYI refers to the value obtained by subtracting the YI value measured using the Sunshine Weathermeter prior to exposure (the initial value) from the YI value after exposure. A ΔYI of no greater than 17 was considered passing.

6. Silver Streaks:
   Three-stage test piece plates (3, 2 and 1 mm thickness) 90 mm long and 40 mm wide were prepared using a Model J100E-C5 injection molding machine manufactured by Nippon Steel at a melting temperature of 320° C., and the silver streaks generated on the surface were visually examined.

The amounts of individual components formulated and the test results are summarized in Tables 1 to 3.

TABLE 1

Compositions and Test Results

|  | Working Examples | | |
|---|---|---|---|
|  | 1 | 2 | 3 |
| PC, parts | 100 | 100 | 100 |
| SI, parts | 1.5 | 0.7 | 1.5 |
| PZ, parts | 5 | 5 | 10 |
| PTSNa, parts | 0.2 | 0.2 | 0.2 |
| PTFE, parts | 0.4 | 0.4 | 0.4 |
| Flame retardance UL94 | V-0 | V-0 | V-0 |
| Notched Izod impact strength kg·cm/cm | 70 | 65 | 40 |
| Deflection temperature under load, ° C. | 117 | 117 | 105 |

TABLE 2

Compositions and Test Results

| | Comparative Examples | | | | | | |
|---|---|---|---|---|---|---|---|
| | 1 | 2 | 3 | 4 | 5 | 6 | 7 |
| PC, parts | 100 | 100 | 100 | 100 | 100 | 100 | 100 |
| SI, parts | 1.5 | 1.5 | 1.5 | 1.5 | 1.5 | 0.005 | 4 |
| PZ, parts | — | — | — | 0.3 | 21 | 5 | 5 |
| P1, parts | 5 | — | — | — | — | — | — |
| P2, parts | — | 5 | — | — | — | — | — |
| P3, parts | — | — | 5 | — | — | — | — |
| PTSNa, parts | 0.2 | 0.2 | 0.2 | 0.2 | 0.2 | 0.2 | 0.2 |
| PTFE, parts | 0.4 | 0.4 | 0.4 | 0.4 | 0.4 | 0.4 | 0.4 |
| Flame retardance UL94 | NR | NR | NR | NR | V-0 | NR | NR |
| Notched Izod impact strength kg·cm/cm | 13 | 13 | 13 | 80 | 8 | 15 | 85 |
| Deflection temperature under load, °C | 112 | 111 | 110 | 130 | 75 | 117 | 117 |

TABLE 3

Compositions and Test Results

| | Example | Comparative Example | | | | |
|---|---|---|---|---|---|---|
| | 4 | 8 | 9 | 10 | 11 | 12 |
| PC, parts | 100 | 100 | 100 | 100 | 100 | 100 |
| SI, parts | 1.5 | 1.5 | 1.5 | 1.5 | 1.5 | 1.5 |
| PZ1 | 5 | — | 5 | 5 | 5 | 5 |
| P1, parts | — | 5 | — | — | — | — |
| P2, parts | — | — | — | — | — | — |
| P3, parts | — | — | — | — | — | — |
| PTSNa, parts | 0.2 | 0.2 | 0.2 | 0.2 | 0.2 | 0.2 |
| PTFE, parts | 0.4 | 0.4 | 0.4 | 0.4 | 0.4 | 0.4 |
| TiO$_2$, parts | 11 | 11 | 3 | 30 | 11 | 11 |
| POHS, parts | 0.5 | 0.5 | 0.5 | 0.5 | 3 | 0.03 |
| Flame retardance UL94 | V-0 | NR | V-0 | NR | NR | NR |
| Notched Izod impact strength kg·cm/cm | 60 | 10 | 70 | 10 | 65 | 25 |
| Deflection temperature under load, °C | 117 | 112 | 117 | 117 | 115 | 117 |
| Silver streak | ○ | ○ | ○ | ○ | X | X |
| Degree of yellowing, ΔYI | 15 | 45 | 17 | 13 | 15 | 15 |
| Light reflectivity Before irradiation | 96 | 96 | 87 | 97 | 96 | 93 |
| Light reflectivity After irradiation | 95 | 88 | 85 | 96 | 94 | 91 |

Note:
NR is an abbreviation for "no rating".

As shown by the data for Working Examples 1 to 4, all specifications for flame retardance, optical properties, notched Izod impact strength, deflection temperature under load, degree of yellowing and light reflectivity were satisfied when the essential components of the present invention were used and the formulation rates of each component were within the range specified.

In contrast, each sample encountered problems when components other than the essential components of the present invention were used or the amount of essential components used did not satisfy the specified range.

Phosphazane Compound:

When the amount added was less than the range specified, as was the case in Comparative Example 4, flame retardance was not realized. In contrast, when the amount exceeded the range specified, as it did in Comparative Example 5, properties such as impact strength and deflection temperature under load declined extensively.

Silicone Compound:

When the amount added was less than the range specified, as was the case in Comparative Example 6, the desired flame retardance and impact strength were not realized. Similarly, the flame retardance specifications were not satisfied when the specified range was exceeded as it was in Comparative Example 7.

Phosphate Ester:

In Comparative Examples 1, 2 and 3, a silicone compound and a phosphate ester of the present invention were used in combination. However, no synergistic effect of the two compounds was observed at all, and various measures of performance even declined. [The table stops at comparative example 7]

In Comparative Example 8, the impact strength declined extensively. In addition, the degree of yellowing (ΔYI) and the reflectivity (ΔY) declined so extensively that the material did not satisfy the specifications.

Titanium Oxide:

The amount of titanium oxide added in Comparative Example 9 was much less than the lower limit of the specified range, and the light reflectivity did not satisfy the specifications. In contrast, in Comparative Example 10 when the amount of titanium oxide added exceeded the upper limit of the specified range, flame retardance and impact strength did not satisfy the specifications.

Organo Hydrogen Siloxane:

In Comparative Example 11, the amount of organo hydrogen siloxane added exceeded the upper limit of the specified range. In this case, flame retardance declined and the amount of hydrogen gas generated was extremely large causing a pronounced silver streak generation. In addition, the amount of organo hydrogen siloxane added in Comparative Example 12 was lower than the specified range. In this case, flame retardance and impact resistance declined and silver streaks were also generated.

Advantages of the Invention

Since the flame retardant polycarbonate resin composition of the present invention does not contain a halogen type flame retarding agent comprising chlorine compounds, bromine compounds and the like, no gas derived from a halogen type flame retarding agent are generated when burned. Furthermore, the composition is not only provided with a high degree of flame retardance and light reflectivity but also has excellent impact resistance, heat resistance, light resistance and the like and can preferably be used as a material for various internal and external uses associated with electrical, electronic and OA applications.

What is claimed is:

1. A flame retardant polycarbonate resin composition comprising 100 parts by weight of a polycarbonate resin (A), 0.01 to 3 parts by weight of a silicone compound (B) having a branched chain structure and organic functional groups, wherein said organic functional groups comprise (i) aromatic groups or (ii) both aromatic groups and non-aromatic hydrocarbon groups, 0.5 to 20 parts by weight of a phosphazene compound (C), 0.01 to 2 parts by weight of an organometallic salt (D), 0.01 to 2 parts by weight of a fiber-forming type fluorine-containing polymer (E), 5 to 25 parts by weight of titanium oxide (F) per 100 parts by weight of a polycarbonate resin (A) and 0.05 to 2 parts by weight of a poly(organo hydrogen siloxane) (G), per 100 parts by weight of a polycarbonate resin (A).

2. The flame retardant polycarbonate resin composition of claim 1 wherein said silicone compound (B) contains at least 20 mole % of units having the formula $RSiO_{0.5}$ (T units) and/or units having the formula $SiO_{2.0}$ (Q units) based on the total siloxane units ($R_{3-0}SiO_{2-0.5}$), wherein R represents an organic functional group.

3. The flame retardant polycarbonate resin composition of claim 1 wherein at least 20 mole % of the organic functional groups contained in the silicone compound (B) are aromatic groups.

4. The flame retardant polycarbonate resin composition of claim 1 wherein in the organic functional groups contained in the compound (B) the aromatic groups are phenyl groups, the side chains that are not phenyl groups are methyl groups and the terminal groups are at least one selected from the group consisting of methyl group, phenyl group and hydroxyl group.

5. The flame retardant polycarbonate resin composition of claim 1 wherein said phosphazene compound is at least one selected from the group consisting of:

(1) a cyclic phenoxyphosphazene represented by the general formula (Chemical formula 1)

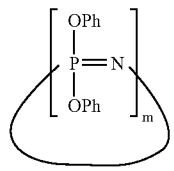

(wherein m represents an integer of 3 to 25, and Ph represents a phenyl group), (2) an open-chain phenoxyphosphazene represented by the general formula (Chemical formula 2)

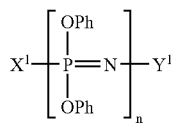

(wherein $X^1$ represents —N=P(OPh)$_3$ or —N=P(O)OPh, $Y^1$ represents —P(OPh)$_4$ or —P(O)(OPh)$_2$, n represents an integer of 3 to 10,000 and Ph represents a phenyl group), and (3) a crosslinked phenoxyphosphazene compound obtained by crosslinking at least one compound selected from the group consisting of said cyclic phenoxyphosphazenes and said open-chain phenoxyphosphazenes with at least one crosslinking group selected from the group consisting of o-phenylene group, m-phenylene group, p-phenylene group and bis phenylene group represented by the general formula (Chemical formula 3)

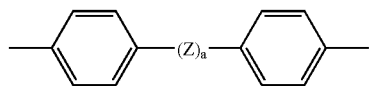

(wherein Z represents —C(CH$_3$)$_2$—, —SO$_2$—, —S— or —O— and a represents 0 or 1), wherein (a) said crosslinking group exists between two oxygen atoms where phenyl groups of the phosphazene compounds have been removed, (b) the proportion of phenyl groups is 5000 to 99.900 based on the total number of total phenyl groups in said phosphazene compound (Chemical formula 1) andlor said phosphazene compound (Chemical formula 2) identified above, and (c) no free hydroxyl group is present in the molecule.

6. The flame retardant polycarbonate resin composition of claim 1 wherein said organometallic salt (D) is a metal salt of an aromatic sulfonic acid or a metal salt of a perfluoroalkane sulfonic acid.

7. The flame retardant polycarbonate resin composition of claim 1 wherein said fiber-forming fluorine-containing polymer (E) is polytetrafluoroethylene.

8. The flame retardant polycarbonate resin composition of claim 1 wherein said titanium oxide (F) is a titanium oxide the surface of which is treated by a phosphoric acidized polyene.

9. The flame retardant polycarbonate resin composition of claim 8 wherein the extent of the surface treatment of said titanium oxide (F) is that the weight of contained phosphorus is about 0.04% to 0.1% by weight based on the weight of the titanium oxide.

10. The flame retardant polycarbonate resin composition of claim 2 wherein at least 20 mole % of the organic functional groups contained in the silicone compound (B) are aromatic groups.

11. The flame retardant polycarbonate resin composition of claim 10 wherein, in the organic functional groups contained in the compound (B), the aromatic groups are phenyl groups, the side chains that are not phenyl groups are methyl groups, and the terminal groups are at least one selected from the group consisting of methyl group, phenyl group and hydroxyl group.

12. The flame retardant polycarbonate resin composition of claim 11 wherein said phosphazene compound is at least one selected from the group consisting of:

(1) a cyclic phenoxyphosphazene represented by the general formula (Chemical formula 1)

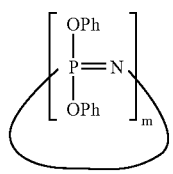

(wherein m represents an integer of 3 to 25, and Ph represents a phenyl group), (2) an open-chain phenoxyphosphazene represented by the general formula (Chemical formula 2)

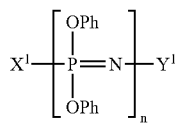

(wherein $X^1$ represents N=P(OPh)$_3$ or —N=P(O)OPh, $Y^1$ represents —P(OPh)$_4$ or —P(O)(OPh)$_2$, n represents an integer of 3 to 10,000 and Ph represents a phenyl group), and (3) a crosslinked phenoxyphosphazene compound obtained by crosslinking at least one compound selected from the group consisting of said cyclic phenoxyphosphazenes and said open-chain phenoxyphosphazenes with at least one crosslinking group selected from the group consisting of o-phenylene group, m-phenylene group, p-phenylene group and bis phenylene group represented by the general formula (Chemical formula 3)

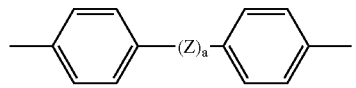

(wherein Z represents C(CH$_3$)$_2$—, —SO$_2$—, —S— or —O— and a represents 0 or 1), wherein (a) said crosslinking group exists between the oxygen atoms where phenyl groups of the phosphazene compounds have been removed, (b) the proportion of phenyl groups is 50% to 99.9% based on the total number of total phenyl groups in said phosphazene compound (Chemical formula 1) and/or said phosphazene compound (Chemical formula 2) identified above, and (c) no free hydroxyl group is present in the molecule.

13. The flame retardant polycarbonate resin composition of claim 12 wherein said organometallic salt (D) is a metal salt of an aromatic sulfonic acid or a metal salt of a perfluoroalkane sulfonic acid.

14. The flame retardant polycarbonate resin composition of claim 13 wherein said fiber-forming fluorine-containing polymer (E) is polytetrafluoroethylene.

15. The flame retardant polycarbonate resin composition of claim 14 wherein said titanium oxide (F) is a titanium oxide the surface of which is treated by a phosphoric acidized polyene.

16. The flame retardant polycarbonate resin composition of claim 15 wherein the extent of the surface treatment of said titanium oxide (F) is that the weight of contained phosphorus is about 0.04% to 0.1% by weight based on the weight of the titanium oxide.

* * * * *